March 6, 1951        R. T. CLOUD        2,544,587
COMPONENT RESOLVER FOR MAPPING APPARATUS
Filed March 5, 1948        3 Sheets-Sheet 1
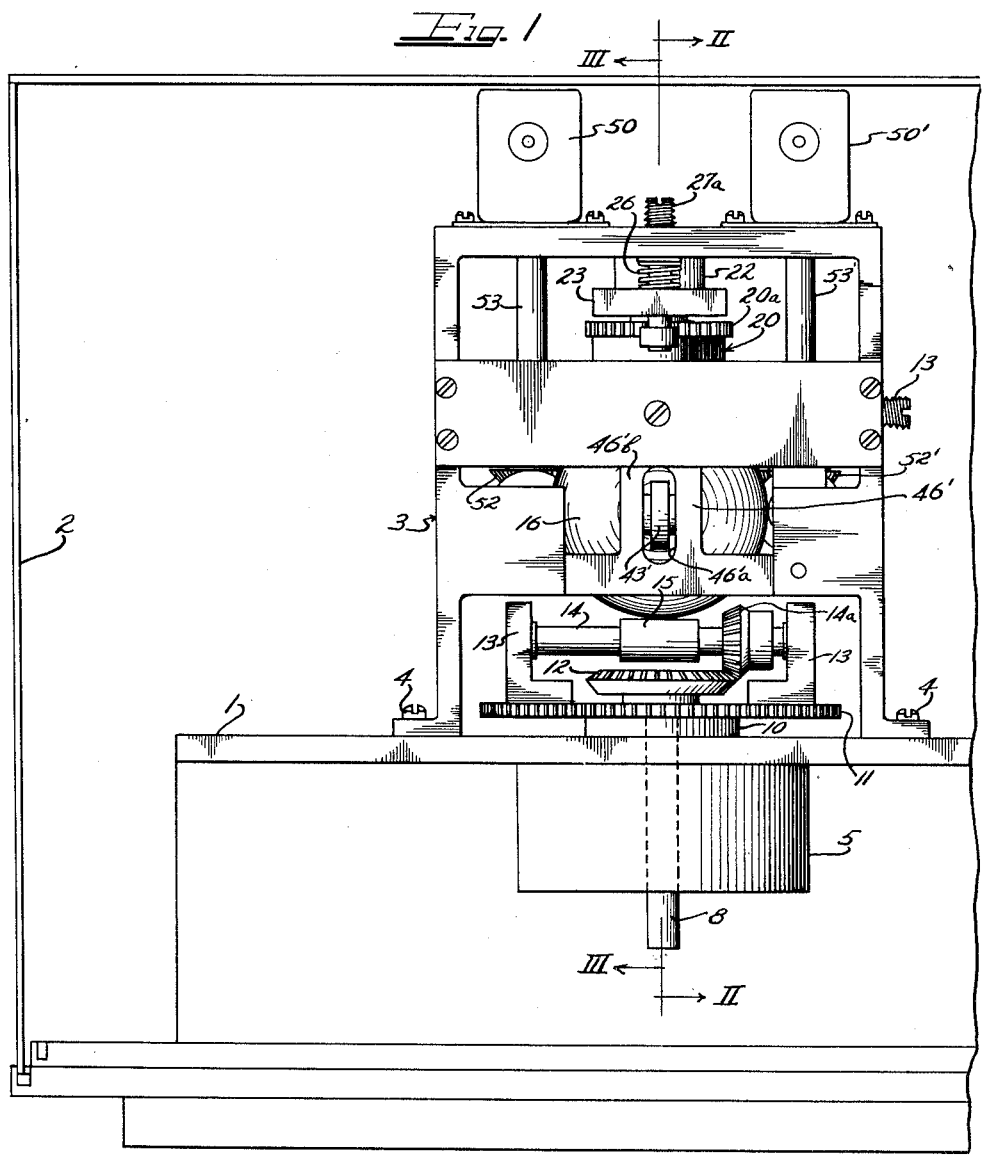
Inventor
RAYMOND T. CLOUD

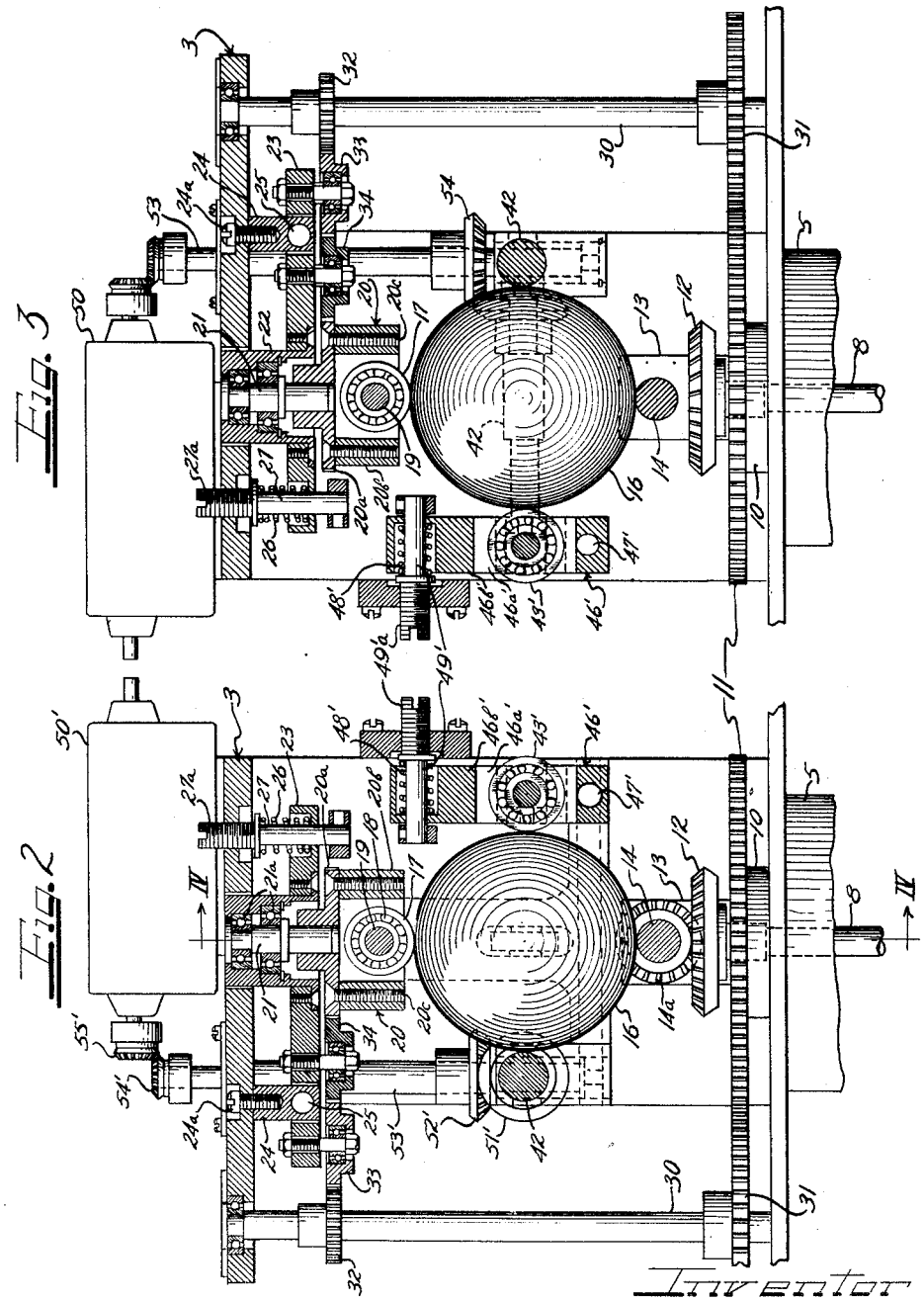

March 6, 1951 — R. T. CLOUD — 2,544,587
COMPONENT RESOLVER FOR MAPPING APPARATUS
Filed March 5, 1948 — 3 Sheets-Sheet 3
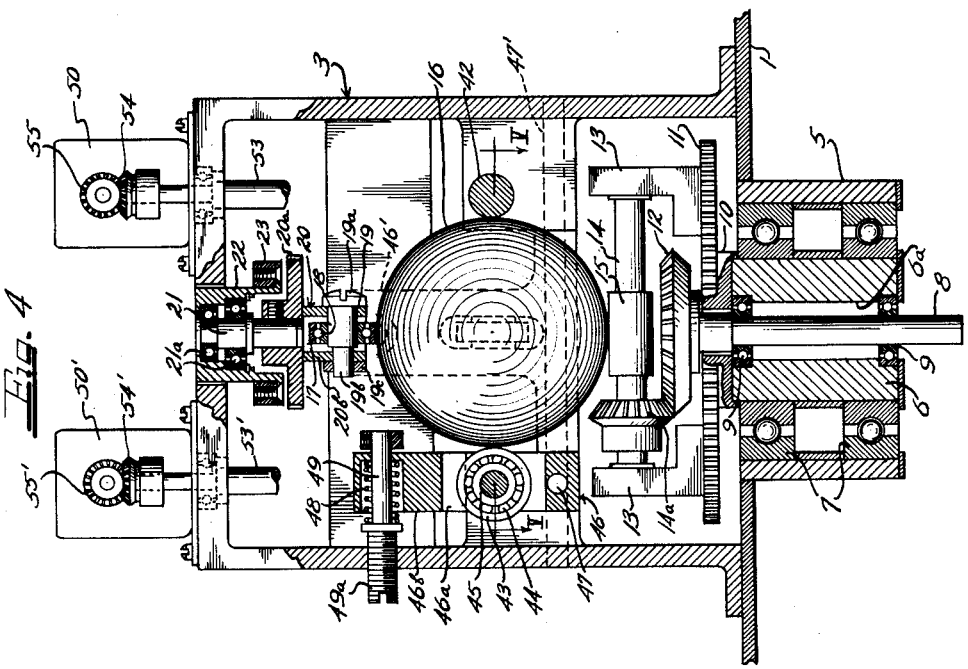
Inventor
RAYMOND T. CLOUD Patented Mar. 6, 1951

2,544,587

UNITED STATES PATENT OFFICE 2,544,587

COMPONENT RESOLVER FOR MAPPING APPARATUS

Raymond T. Cloud, Houston, Tex., assignor to North American Geophysical Company, Houston, Tex., a corporation of Texas Application March 5, 1948, Serial No. 13,279

1 Claim. (Cl. 74—209)

This invention relates to a mapping device, and particularly to a device which may be carried by a moving object or vehicle to indicate at any time the position of the vehicle by directional components of its departure from a preselected starting or reference point. As to certain features, this application constitutes a continuation-in-part of my copending application Serial No. 714,876 filed December 7, 1946, now U. S. Patent No. 2,348,410.

In my above identified copending application, there is described and claimed a mapping device which will continuously record the path of movement of a moving vehicle with respect to any desired system of fixed earth coordinates. Such device finds particular utility in geological or seismic surveys, inasmuch as such device provides a continuous map of the path traversed by a moving vehicle carrying the various instruments employed in the survey.

In many applications, it is not necessary to have a continuous map of the path traversed by the vehicle. More frequently, geophysical readings and measurements are taken at various spaced points along the path traversed by the vehicle and it is sufficient that the location of each of such measuring points be known with respect to a fixed reference point without requiring that the exact path traversed by the vehicle intermediate any of the measuring points be recorded or mapped. Hence, if the departure of the vehicle from a fixed reference point may be expressed in terms of components of departure along two angularly spaced axes having a known relationship with respect to the reference point, it is apparent that any desired point along the path of the vehicle may be determined and plotted on a map. Since compass coordinates provide convenient angularly spaced axes, the most common utilization of such point-by-point mapping procedure is to determine the position of the vehicle with respect to the reference point in terms of so many miles north or south from the reference point and so many miles east or west. Knowing these two components of departure from the reference point, it is readily possible to exactly plot the position of the vehicle at the measuring point.

Accordingly, it is an object of this invention to provide an improved mapping device, particularly a device for ascertaining and indicating the position of a moving vehicle at any desired point along its path of travel with respect to a preselected fixed reference point.

A further object of this invention is to provide a mapping device which will provide at any point along the path of the travel of a moving vehicle an indication of the respective components of departure of the vehicle from a preselected reference point along a pair of angularly spaced axes which have their origin at the reference point.

A particular object of this invention is to provide an improved method and apparatus for indicating the position of a moving vehicle by the translation of the actual velocity and direction of movement of the vehicle into the movement of a sphere which is capable of rotation about any diametral axis lying in a preselected great circle plane. The rate of rotation of the sphere is produced in proportion to the vehicle velocity while the axis of rotation is angularly varied in accordance with the direction of movement of the vehicle.

Still another object of this invention is to provide an improved method and apparatus for analyzing a vector quantity in terms of its components along a pair of preselected angularly spaced axes.

The specific nature of this invention, as well as other objects and advantages thereof will become apparent to those skilled in the art from the following detailed description, taken in conjunction with the attached sheets of drawings, on which, by way of preferred example only, is illustrated one modification of this invention.

On the drawings:

Figure 1 is a front elevational view of a component resolution mechanism of a mapping device embodying this invention;

Figure 2 is a partial sectional view taken on the plane II—II of Figure 1;

Figure 3 is a partial sectional view taken on the plane III—III of Figure 1;

Figure 4 is a sectional view taken on the plane IV—IV of Figure 2; and

Figure 5 is a partial sectional view taken on the plane V—V of Figure 4.

As shown on the drawings:

As is more fully described in my above identified copending application, mapping devices of this type are generally mounted upon and carried by the vehicle whose path it is desired to map. Obviously, in any mapping device, it is necessary to obtain from the vehicle movement, a first signal which is proportional to the actual velocity of the vehicle at any time, and a second signal which will indicate the angular direction of movement of the vehicle with respect to any preselected system of fixed earth coordinates. Such signals may obviously be obtained in a variety of manners, and I preferably employ the mechanism described and illustrated in detail in my above-identified copending application to produce such two signals in the form of rotational mechanical movements. It will, therefore, be understood that the two input signals which are applied to a mapping device embodying the present invention may be derived in the manner exactly similar to that employed in my above identified copending application.

Referring to the drawings, the new elements of a mapping device embodying this invention are shown as mounted upon a platform 1 which is in turn disposed within a housing 2. A support casting 3, which will be described in more detail later, is mounted on top of platform 1 in any convenient manner, such as by bolts 4. Beneath the casting 3, the platform 1 is apertured and a sleeve-like bearing housing 5 is secured in depending relationship in such aperture by any suitable arrangement. A bearing sleeve 6 is centrally journaled within housing 5 by axially spaced anti-friction units 7. In addition, a vertical shaft 8 is journaled within the bore 6a of bearing sleeve 6 by axially spaced anti-friction units 9. Bearing sleeve 6 is corotatably secured to a hub element 10 which, in turn, has a large input gear element 11 secured thereto.

The shaft 8 projects upwardly through the gear 11 and mounts a bevel gear 12 on its upper end. A pair of bearing supports 13 are respectively mounted on the upper surface of gear 11 and provide journals for rotatably supporting a shaft 14 therebetween. Hence the axis of shaft 14 is generally perpendicular to the axis of rotation of both the driving gear 11 and the shaft 8. A bevel gear 14a is mounted on shaft 14 and cooperates with bevel gear 12. The central portion of shaft 14 is provided with an enlarged diameter roller section 15 which may or may not constitute an integral portion of the shaft 14.

In the construction thus far described, it is apparent that the rotation of the roller element 15 about its natural axis is controlled by the rotation of the shaft 8 while, in addition, the roller element 15 is mounted for rotation about an axis perpendicular to its natural axis and its rotation about such axis is controlled by the driving gear 11.

By reference to my above identified copending application, it will be found that the driving gear 11 and shaft 8 correspond exactly to similarly disposed elements in the disclosure of such application. As is completely described in such copending application, mechanism may be provided for rotating the shaft 8 at a rate which is an accurate function of the actual velocity of movement of the vehicle upon which the mapping device is carried. Similarly, the driving gear 11 is rotated by mechanism similar to that shown in my copending application to angularly shift the roller element 15 as a function of the angular departure of the direction of the travel of the moving vehicle with respect to a fixed compass coordinate. Hence it is apparent that the rotation of the shaft 8 may be considered to be one input signal to the mapping device which is a function of the actual velocity of the traveling vehicle, while the rotation of the driving gear 11 may be considered to be a second signal input to the mapping device which is a function of the direction of movement of the traveling vehicle.

In accordance with this invention, these two input signals are translated into a rotational movement of a sphere 16. The sphere 16 is rotatably supported in a central position within the casting 3 by a plurality of pairs of diametrally opposed roller units.

The roller portion 15 of the shaft 14 constitutes one of the first pair of rollers. Diametrically opposite the roller portion 15, a cooperating roller 17 is provided which is of sleeve-like construction and mounted by anti-friction unit 18 upon a horizontal shaft 19. The shaft 19 is in turn supported in transverse relationship in the walls of an inverted cup-shaped housing 20 which is formed of a gear base portion 20a and a rectangular wall portion 20b secured to the gear portion by a plurality of screws 20c. The shaft 19 may, if desired, constitute merely the cylindrical shank portion of a headed bolt having a head portion 19a and a threaded end portion 19b which is secured in position by the threading of a nut 19c on one end thereof. The hub portion 20a of the bearing support unit 20 is secured to the bottom end of a vertical stub shaft 21 which has the top end thereof supported in a hollow casing 22 by spaced anti-friction units 21a. Casing 22 is in turn mounted in one end portion of a medially pivoted support arm 23 which is pivoted by pin 25 to a depending bracket 24 secured to the top wall of casting 3 by suitable bolts 24a. To provide clearance for the pivotal movement of the casing, the top wall of the casting 3 is apertured as indicated at 3a to permit the casing to project therethrough and move unimpededly over a limited range. The outer end of support arm 23 is urged toward the sphere 16 by a spring 26 which is mounted in surrounding relationship to a shaft of a bolt-like adjusting element 27 which has a threaded portion thereof 27a engaging in a suitably threaded aperture in the top wall of the base casting 3 so as to permit convenient adjustment of the effective pressure exerted by the spring 26 from the exterior of the casting 3.

It is therefore apparent that the movable mounting of the roller unit 17, plus the provision of the spring 26, produces a spring-pressed engagement of the sphere 16 with both the roller units 15 and 17. To facilitate the driving action of the roller portion 15 on the sphere 16, it is desirable that the roller 17 be shifted in angular position relative to the sphere in synchronism with the shifting movements of the roller portion 15 about the axis which is coincident with the axis of driving gear 11. To accomplish such synchronization, a vertical shaft 30 is suitably journaled in the casting 3 and a gear 31 at its lower end meshes with the driving gear 11. At its upper end, shaft 30 mounts a gear 32 which meshes with a chain of gears, respectively 33 and 34, to impart a driving movement to the gear portion 20a of the bearing support member for the roller unit 17. The gear ratios in this aforedescribed gear train are selected so as to produce exactly synchronized movement of the roller unit 17 about the axis defined by the shaft 21, with respect to the movement of the roller portion 15 about the axis provided by the driving gear 11.

From the foregoing description, it is apparent that the concurrent application of the two signals to the shaft 8 and the driving gear 11 which are respectively proportional to the velocity of the moving vehicle and to the direction of travel of such vehicle will result in a rotation of the sphere 16 at a rate which is proportional to the velocity of the vehicle and about varying diametral axes lying in a horizontal great circle plane of the sphere 16, the particular diametral axis being determined by the extent of angular shifting of the driving gear 11, and the resultant shifting of roller portion 15 and roller unit 17.

To properly support the sphere 16 against lateral displacement, as well as for the purpose of resolving the rotational movements of the sphere 16 into two components, two additional pairs of diametrically opposed roller units are provided, each of which roller unit contacts the sphere 16 along the aforementioned horizontal great circle plane.

As is best shown in Figure 5, each pair of roller units is of substantially identical construction.

One of the rollers of one pair comprises a fixed axis shaft 40 having the ends thereof supported by suitable bearings 41 in the casting 3 and having an enlarged central roller portion 42 which contacts the surface of sphere 16. The opposite roller 43 is journaled by anti-friction element 44 upon a bolt-like shaft 45 which is mounted in transverse relationship in a slot 46a (Figure 4) provided in a movable, inverted T-shaped, bearing support unit 46. The bearing support 46 is in turn pivotally mounted on a shaft 47 which is suitably mounted at each end in the opposed wall portions of the casting 3. The stem portion 46b of the bearing support 46 extends upwardly beyond the roller shaft 44 and is urged inwardly toward the sphere 16 by a spring 48 which is mounted on a bolt-like retainer 49. The threaded portion 49a of retainer 49 projects through a suitable threaded aperture in the side wall of casting 3 and hence permits the effective force of spring 48 to be conveniently adjusted from the exterior of the casting 3.

With such construction, the opposed rollers 42 and 43 are resiliently held in engagement with the surface of sphere 16 and hence the roller shaft 42 will be driven by the sphere 16 at a rate which is proportional to the component of rotation of the sphere 16 which occurs about a diametral axis in the horizontal great circle plane which is parallel to the axis of roller shaft 42.

Such movement of the roller 42 is transmitted to a mechanical integrating mechanism 50 which is supported on the top of casting 3. Any suitable type of drive connection between roller shaft 42 and integrating mechanism 50 may be employed, such as a bevel gear 51 secured to roller shaft 42, a cooperating bevel gear 52 secured to the bottom of a vertical shaft 53, and a bevel gear 54 at the top end of shaft 53 which meshes with an input gear 55 of the integrating mechanism 50.

As previously indicated, the third pair of diametrically opposed roller elements which cooperate with the sphere 16 in the same horizontal great circle plane are substantially identical in construction to the pair just described. Similar numerals 40' through 55' have been applied to corresponding elements of the third pair of rollers and hence it will be seen that a second integrating mechanism 50', also mounted on the top of base casting 3, is driven in response to the rotation of roller shaft 42' which, in turn, is rotated by the sphere 16 at a rate which is equal to the component of rotation of the sphere 16 about a diametral axis in the aforementioned horizontal great circle plane which is parallel to the axis of roller shaft 42'.

Since all of the rotational movement of the sphere 16 is limited to rotation about various axes in a selected great circle plane of the sphere, here constituting the horizontal great circle plane, and, since the follower rollers 42 and 42' are disposed in right angular relationship, it is apparent that the aforedescribed construction resolves the rotational movement of the sphere into two components represented respectively by the rotational movements imparted to the roller shafts 42 and 42'. Such components of movement of the sphere are in turn directly applied to the integrating mechanisms 50 and 50' and it is therefore apparent that the respective outputs of such integrating mechanisms represent components of the actual departure of the moving vehicle from any preselected reference point on its path. While the integrating mechanisms 50 and 50' may comprise any one of several well-known varieties, preferably a mechanism is employed which will provide a visual indication, in appropriate units of distance, of the integration of the movement applied thereto which has been effected.

In operation, the aforedescribed mapping device is so correlated with respect to the compass (not shown) or other element by which the driving gear 11 is shifted in relation to the direction of travel of the vehicle, so that when the vehicle is traveling directly along any selected compass coordinate, for example, in a direction that is exactly north, then the set of driving rollers 15 and 17 will be angularly positioned with respect to the sphere 16 so as to produce rotation of the sphere only about that diametral axis of the horizontal great circle plane which is parallel to the axis of one of the follower rollers, for example, the roller 42. Of course, the sphere is rotated about such axis, through the signal transmitted by the shaft 8, at a rate which is exactly proportional to the velocity of the vehicle. Thereafter, any deviation of the vehicle from its true northerly direction will result in a shifting of the driving gear 11 and hence a shifting of the diametral axis about which the sphere 16 is rotating. Such shifting will produce a component of rotation of the sphere which will drive the other follower roller 42' which, because of its right angular relationship with the first follower roller 42a, will necessarily measure the component of vehicle velocity in the east-west direction.

Assuming that both of the integrating mechanisms 50 and 50' were zeroed at some predetermined reference point on the path of the vehicle, the output of the integrating mechanism 50 at any point along the vehicle path will represent the integrated departure of the vehicle in the north-south direction from the reference point, while the output of the integrating mechanism 50' will indicate the integrated departure of the vehicle from the reference point in the east-west direction. With these two components of departure, it is a simple matter to plot the exact position of the vehicle with respect to the reference point.

From the foregoing description, it will be apparent that this invention provides a novel and greatly improved method and apparatus for determining the position of a moving vehicle at any point in its path with respect to a fixed reference point. The described apparatus is not only highly accurate and reliable in its operation, but also provides an unusually rugged arrangement, yet one which may be conveniently and economically manufactured and assembled.

It will, of course, be understood that various details of construction or operation may be modified through a wide range without departing from the principles of this invention and it is, therefore, not the purpose to limit the patent granted hereon otherwise than necessitated by the scope of the appended claim.

I claim as my invention:

In a vehicle-carried mapping apparatus of the type employing a hollow support casting having a spherical element mounted for fully universal movement therein to decompose the relative displacement of said vehicle into rectilinear components by means of friction rollers bearing upon the element at diametrically opposed points, certain of said rollers being adapted to rotate said element in response to the speed and direction of travel of said vehicle, the improvement comprising a bearing support member, a bearing means supported on said member, a roller journalled for rotation in said bearing means, one end of said bearing support member being pivotally mounted to said hollow support casting, the other end of said bearing support member having an adjustable bolt-like retainer operatively connected thereto, a coil spring around said retainer and having one end thereof bottomed against said bearing support member to resiliently load the roller into contact with the spherical element, and means between said retainer and said support casting to adjustably position the retainer to selectively vary the spring loading on the roller.

RAYMOND T. CLOUD.

REFERENCES CITED

The following references are of record in the file of this patent:

UNITED STATES PATENTS

| Number | Name | Date |
|---|---|---|
| 572,832 | Samohod | Dec. 8, 1896 |
| 1,069,842 | Anschutz-Kaempfe | Aug. 12, 1913 |
| 1,701,582 | Mengden | Feb. 12, 1929 |
| 1,854,391 | Avery | Apr. 19, 1932 |
| 1,963,457 | Avery | June 19, 1934 |
| 1,953,894 | Crouse | Apr. 3, 1934 |
| 2,412,468 | Newell | Dec. 10, 1946 |

FOREIGN PATENTS

| Number | Country | Date |
|---|---|---|
| 188,527 | Great Britain | Nov. 16, 1922 |

Certificate of Correction

Patent No. 2,544,587 March 6, 1951

RAYMOND T. CLOUD

It is hereby certified that error appears in the printed specification of the above numbered patent requiring correction as follows:

Column 1, line 9, after "1946", strike out ", now U. S. Patent No. 2,348,410";

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*